United States Patent
Martin et al.

(10) Patent No.: US 6,356,603 B1
(45) Date of Patent: Mar. 12, 2002

(54) INTEGRATED MULTI-MODE BANDPASS SIGMA-DELTA RECEIVER SUBSYSTEM WITH INTERFERENCE MITIGATION AND METHOD OF USING SAME

(75) Inventors: William J. Martin, Ft. Lauderdale, FL (US); William J. Turney, Schaumburg; Paul H. Gailus, Prospect Heights, both of IL (US); Edward T. Clark, Plantation, FL (US); Joshua E. Dorevitch, Chicago; Terry K. Mansfield, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/642,491

(22) Filed: Aug. 18, 2000

Related U.S. Application Data

(63) Continuation of application No. 09/174,628, filed on Oct. 19, 1998, now Pat. No. 6,160,859.

(51) Int. Cl.[7] ............................................. H04L 27/08
(52) U.S. Cl. ........................ 375/345; 375/316; 345/143
(58) Field of Search ............................... 375/345, 355, 375/377, 346, 349, 350, 254, 285, 329, 316, 247; 341/143, 139, 155, 157; 455/232.1, 234.1; 329/304

(56) References Cited

U.S. PATENT DOCUMENTS

| | | | | |
|---|---|---|---|---|
| 5,345,409 A | * | 9/1994 | McGrath et al. | 364/736 |
| 5,442,353 A | * | 8/1995 | Jackson | 341/143 |
| 5,541,600 A | * | 7/1996 | Blumenkrantz et al. | 341/139 |
| 5,621,345 A | * | 4/1997 | Lee et al. | 327/254 |
| 5,689,440 A | * | 11/1997 | Leitch et al. | 364/514 R |
| 5,787,125 A | * | 7/1998 | Mittel | 375/329 |

* cited by examiner

Primary Examiner—Jean Corrielus
(74) Attorney, Agent, or Firm—Frank M. Scutch, III

(57) ABSTRACT

An integrated sigma-delta radio frequency (RF) receiver subsystem (200) and method utilizes a multi-mode sigma-delta analog-to-digital converter (215) for providing a single and multi-bit output. A programmable decimation network (221) for reducing the frequency of the in-phase and quadrature bit stream and a programmable formatting network (223) are also used for organizing the in-phase and quadrature components from the decimation network (221) for subsequent signal processing. The invention offers a highly integrated digital/analog RF receiver back-end which incorporates integrated filtering and a smart gain control that is compatible for use with other receiver systems and offering superior performance characteristics.

3 Claims, 3 Drawing Sheets

INTEGRATED MULTI-MODE BANDPASS SIGMA-DELTA RECEIVER SUBSYSTEM WITH INTERFERENCE MITIGATION AND METHOD OF USING SAME

CROSS REFERENCE TO RELATED APPLICATIONS

This is a continuation of application Ser. No. 09/174,628, filed Oct. 19, 1998, and assigned to Motorola, Inc. now U.S. Pat. No. 6,160,859.

TECHNICAL FIELD

This invention relates in general to radio receivers and more particularly to integrated digital radio receiver subsystems.

BACKGROUND

It is well known in the art that a dual conversion radio receiver converts incoming radio frequency (RF) signals using a common heterodyning process with two mixers. The RF signal is most often detected, converted and amplified into an audible format using some type of transducer such as a speaker. As seen in prior art FIG. 1, a known integrated radio receiver back-end or second intermediate frequency stage 10 will include an IF signal input 11 that is amplified by preamp 13 and then fed to a mixer 15 where it is mixed with a signal from a local oscillator synthesizer 17 controlled by a clock synthesizer 19. The resultant second IF signal is then processed by a bandpass sigma-delta ($\Sigma$-$\Delta$) converter 21 where it is noise shaped and converted into a digital format. Undesired out of band components of the converter signal can then be filtered using a discrete time filter 23. Thereafter, it is further processed and mixed to baseband using a frequency translator 25 and local oscillator sourced from the clock synthesizer 19. Undesired components of this resultant signal are filtered using another discrete time filter 29 whose output is fed to the parallel to serial data converter 33 and the output 35. In order to limit the input signal to the $\Sigma$-$\Delta$ converter 21, an automatic gain control (AGC) circuit is employed to keep the $\Sigma$-$\Delta$ converter out of "clip" and reduce signal distortion.

Thus, as can be readily seen from FIG. 1, the radio receivers of today have greatly increased in complexity where they are not only highly integrated but also convert analog signals into a digital format where they can be manipulated and/or digitally processed for use as either audible information or data.

One problem typically associated of such high level integration of digital radio receiver has been to provide the back-end i.e. the second intermediate frequency (IF) components in addition to the digital mode sigma-delta converter in one integrated package. Specific obstacles such as analog or lumped filters (such as inductor-capacitor (LC) filters or ceramic resonators), have made such integrated circuits difficult to use and implement. Thus, the need exists to provide a highly integrated digital/analog RF receiver back-end which incorporates integrated filtering and a smart gain control that is easy to use with other receiver systems and offers superior performance characteristics.

DETAILED DESCRIPTION OF THE PREFERRED EMBODIMENT

Figure 1:
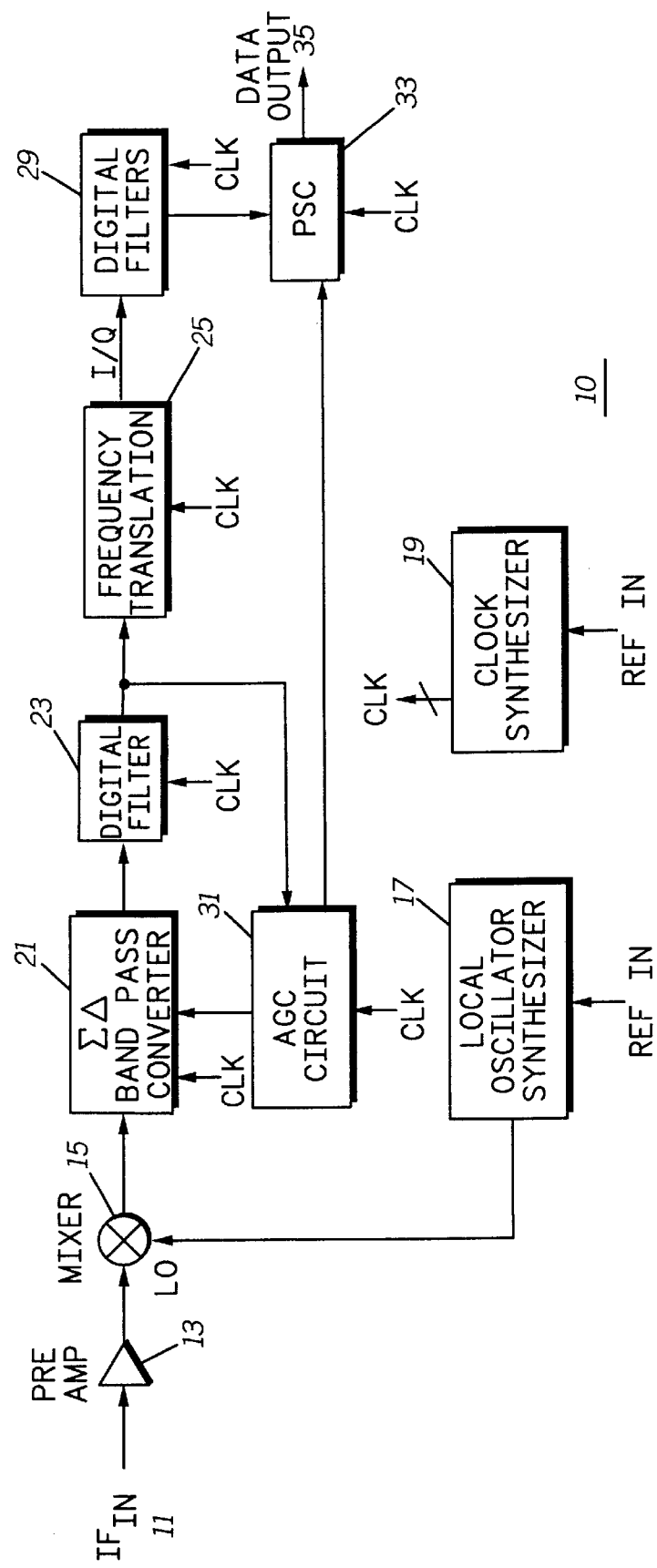
FIG. 1 is a block diagram showing an operational diagram of a back-end radio receiver used in the prior art that employed a single mode sigma-delta converter.
Figure 2:
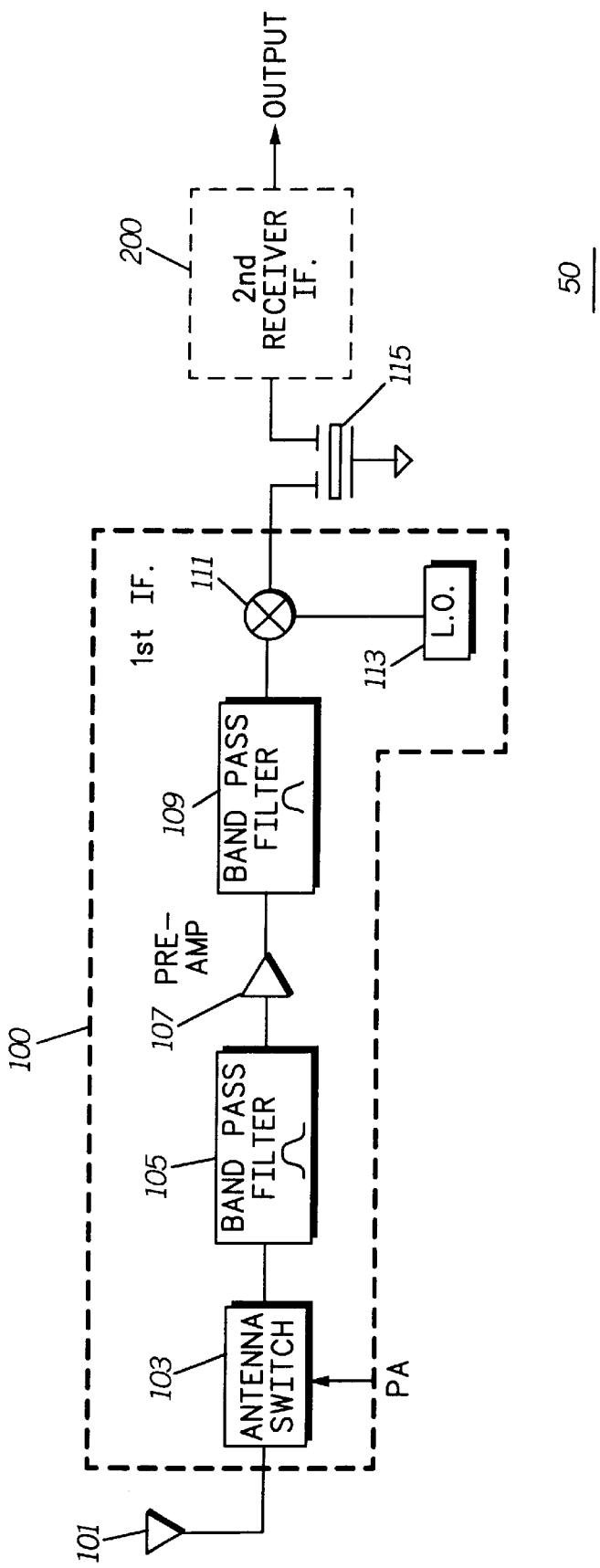
FIG. 2 is a block diagram showing implementation of a super heterodyne receiver that employs the multi-mode sigma-delta receiver subsystem 200.

Referring now to FIG. 2, a general block diagram of a digital dual conversion radio frequency (RF) receiver 50 includes a receiver first intermediate frequency stage 100 also known as the receiver front-end and a receiver second intermediate frequency stage 200 also known as the receiver back-end.

As is generally known in the art, the receiver front end 100 includes RF signals received though an antenna 101 or other input device that is fed through an antenna switch 103 that switches the antenna 101 between the power amplifier and receiver depending on the mode of the electronic device. A band pass filter 105 acts to filter Undesired RF signals outside a specific passband. The remaining filtered signal is amplified using preamp 107 and subjected to another bandpass filter 109 increasing selectivity. Thus, only a narrow band of RF signals are applied to the first mixer 111.

The first mixer 111 uses the RF signal from the bandpass filter 109 where it is mixed with a stable local oscillator signal 113 and output for use by the receiver back-end 200. As is also well known in the art, the first intermediate frequency (IF) signal from the first mixer 111 produces a signal at the sum and difference frequencies of the input signals. Since the primary signal of interest is the difference signal, the sum signal will subsequently be filtered in later receiver stages. In order to couple the RF signal from the receiver front end 100 to the receiver back end 200, a multiple-pole filter 115 can be used to provide a moderate degree of selectivity from the front-end 100 with substantially low signal loss. As known to those skilled in the art, the multiple-pole filter 115 may be a crystal filter, surface acoustic wave (SAW) filter or the like. A wide band crystal or SAW filter is allowable due to the wide dynamic range of the bandpass sigma-delta analog-to-digital converter (ADC). This has the advantage of size and cost reduction.

Figure 3:
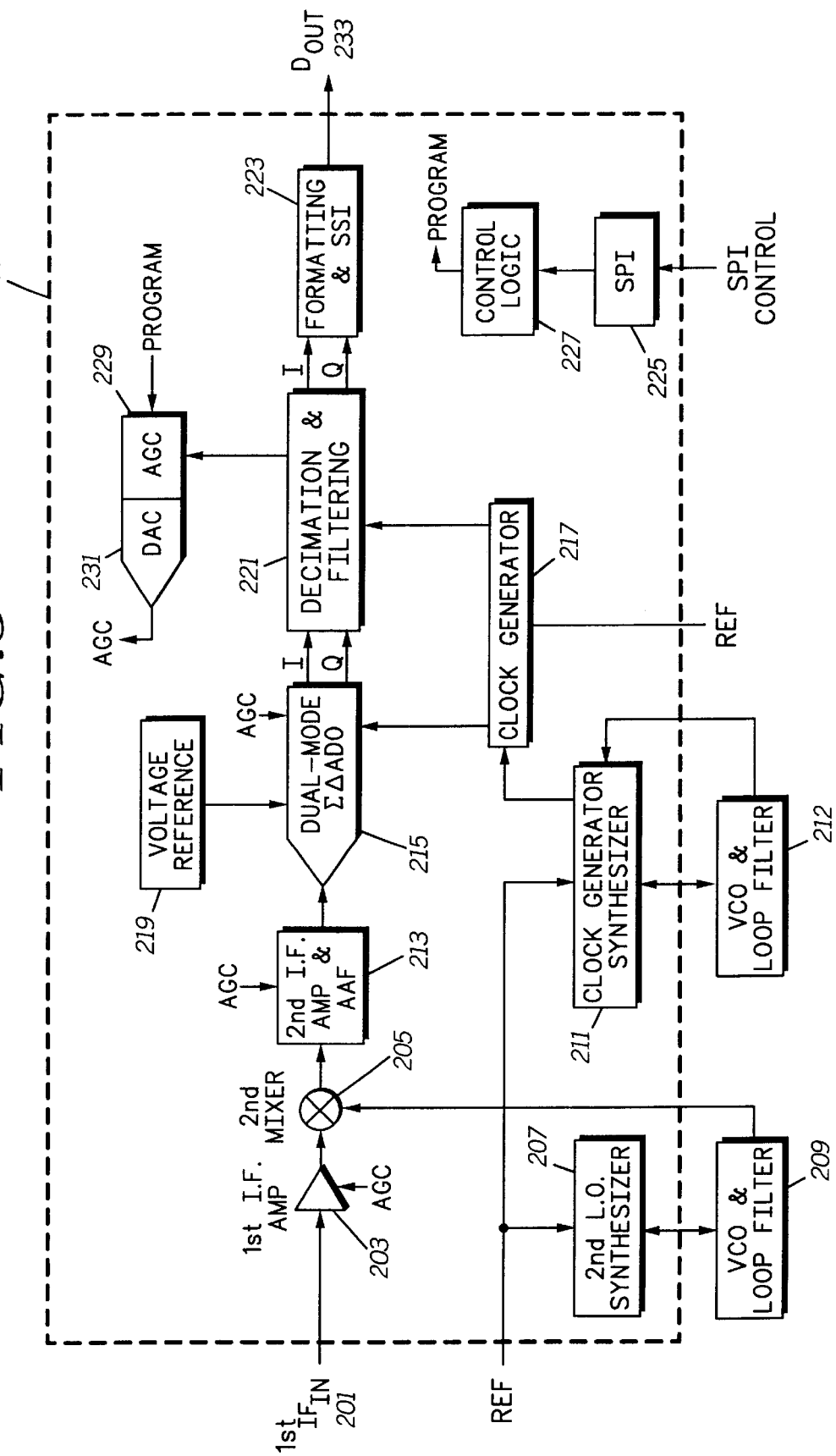
FIG. 3 is a block diagram showing the multi-mode sigma-delta receiver subsystem with interference mitigation according to the present invention.

In FIG. 3, a multi-mode bandpass sigma-delta ($\Sigma$-$\Delta$) receiver subsystem with interference mitigation 200, in accordance with the preferred embodiment of the invention, includes a first IF signal input 201 that is fed to an first IF amplifier 203 whose gain may be controlled with an automatic gain control (AGC) input. The first IF signal input to the first IF amplifier is typically between 10 MHz and 400 MHz. Due to the wide range of second IF frequencies that can be used, this acts as an aid to mitigate any potential interference with on-board oscillators or synthesizers since the input signal to the $\Sigma$-$\Delta$ converter 215 can be controlled. The amplified first IF signal is then mixed with the input from the programmable second local oscillator (LO) synthesizer 207 and a voltage controlled oscillator (VCO) and loop filter 209.

The output of the second mixer is intended to produce a lower frequency for the input to the $\Sigma$-$\Delta$ converter 215 discussed below. The second IF signal is amplified using a second IF amplifier 213, whose gain is also controlled using an AGC signal discussed hereinafter. The second IF amplifier 213 also provides anti-aliasing filtering (AAF). As is well known in the art, spurious or alias signals occur when sampling a signal waveform based on Nyquist criteria. Alias signals can be created or "folded-back" in-band that can later act to interfere or reduce performance of subsequent receiver stages and processing. In order to remove these alias signals, continuous time filtering techniques are most often employed.

The output of the second IF amplifier 213 is then fed to a multi mode bandpass Σ-Δ analog-to-digital converter (ADC) 215. The use of the Σ-Δ converter 215 and voltage reference 219 produce a digital signal from its input analog signal. As will be recognized by those skilled in the art, the Σ-Δ converter offers many advantages. These include a wide dynamic range within the bandwidth of interest due to the feed-back offered within the converter. The IF frequency band is determined by the integrated switched capacitor filter networks and feed forward/feed back parameters of the Σ-Δ converter. This band generally will be centered at the second IF input frequency. Thus, any extraneous noise produced outside this band by the analog-to-digital converter will be eliminated through subsequent digital filtering. Additionally, the Σ-Δ converter 215 is operable at a variety of IF input frequencies easily programmed by changing the frequency of the clock generator 217. Finally, the Σ-Δ converter 215 offers a multiple bandwidth option as well as providing reduced power consumption when lower bandwidth mode(s) are selected. Specifically, wideband signals need higher sampling rates while higher sampling rates require a higher current drain. The multi-mode architecture allows for substantial current drain savings through alternate switching between narrow-band and wide-band modes as necessary.

The clock generator 217 is controlled by the programmable clock generator synthesizer 211 and VCO and loop filter 212 and operates to synchronize operation of both the Σ-Δ converter 215 and the digital mixer/decimation network 221. The clock generator 217 can easily be changed or stepped in order to accommodate a variety of input second IF frequencies to the Σ-Δ converter 215.

A digital signal from the Σ-Δ converter 215 is then applied in a serial bit stream to a digital mixer/decimation network 221. The digital mixer converters the digital data stream out of the Σ-Δ converter into two digital signals, an in phase signal and a quadrature phase signal. The decimation network 221 is used to decimate i.e. reduce the clock frequency and data rate of the incoming digital signals (I and Q) for subsequent digital signal processing. Consequently, the sample rate of the digital signals is reduced. The Nyquist criteria now must be met, in order to prevent and/or eliminate the presence of alias signals. Therefore, it is necessary to both decimate and filter eliminating any alias signals that are produced as a result of this process before further processing can occur. As will be recognized by those skilled in the art, the digital filtering is intended to remove any out of band signals or noise. This programmable capability provides a means for careful placement of spurious responses so as not to degrade receiver performance.

At the output of the decimation network 221, both in-phase (I) and quadrature (Q) bit streams are applied to a formatting network 223. The formatting network 223 has outputs that may be configured via the serial peripheral interface (discussed hereinafter) programming to enable an differential current mode output or differential voltage mode output in addition to the conventional single ended voltage mode output. The formatting network works to organize or format data from both the serial I and Q bit streams for interpretation by a digital signal processor (DSP) (not shown) connected to digital output 233. In order to facilitate data synchronization, formatting block 223 incorporates an embedded work sync functionality. Typically, a 16-bit word is produced from the in-phase information, and a 16-bit word is produced from the quadrature information and a 16-bit word is produced for use as automatic gain control (AGC) information. The synchronous serial interface works to insert synchronous information to determine the start and stop portions for each of these words for subsequent use by a DSP.

A serial peripheral interface (SPI) port 225 and the associated control logic 227 are further provided to programmably control the clip level of the digital signal in the multi-mode Σ-Δ converter 215. This controls the input voltage value within an acceptable limit to maintain the input within a predetermined dynamic range. Since the digital signal is supplied to the DSP circuitry (not shown) located off-chip, the DSP provides additional control of the AGC levels to each of the various AGC controlled components through the SPI port 225. This operates using control logic 227 where configuration data is entered though the SPI port 225. The control logic 227 operates with a programmable AGC circuit 229 whose digital output signal is converted to an analog signal through the use of a digital-to-analog converter 231. The AGC output signal is then used to control the second IF amplifier 213, the second mixer 205, the first IF amplifier 203 and the multi mode Σ-Δ ADC 215.

As will be evident to those skilled in the art, the interference mitigation portion of the multi mode bandpass sigma-delta (Σ-Δ) receiver subsystem 200 includes an internally controlled (m dB) continuously adjustable gain element and a stepped (n dB step) gain element provided in the first IF amplifier/mixer block. The receiver subsystem is programmable, via the SPI port, such that AGC thresholds which limit the input signal to Σ-Δ are held to "x" dB below the clip point. The second IF frequencies are programmable via a change in the converter clock rate. Moreover, programmable decimation ratios are used to allow the selection of the final serial data rates in the digital signal processor (DSP). The subsystem is capable of programmable baseband (i.e. about direct current (DC)) bandwidths in both the wide-band (approx. 150 kHz bandwidth) and narrow-band (less than 3 kHz bandwidth) modes. The switch from narrow-band to wide-band operation offers a distinct advantage to other receiver systems in the art in that the subsystem 200 is capable of multi-mode operation.

Thus, the present invention is directed "to an integrated sigma-delta radio frequency receiver subsystem that includes a multi-mode sigma-delta analog to digital converter that provides a single and multi-bit output. A digital mixer is used to create in-phase and quadrature phase digital baseband signals with a programmable decimation network for reducing the frequency of the in-phase and quadrature bit streams. Finally, a programmable formatting network is used for organizing the in-phase and quadrature components from the decimation network for subsequent signal processing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for controlling an integrated multi-mode bandpass sigma delta radio frequency receiver subsystem comprising the step of:

mixing a first intermediate frequency (IF) signal with a programmable local oscillator signal to provide a programmable second IF signal;

amplifying the second IF signal using an amplifier; and controlling the gain of the amplifier using an AGC to provide an output signal having variable bandwidth;

converting the output signal into in-phase and quadrature output digital signals using a multi-mode sigma-delta analog-to-digital signal converter;

reducing the frequency of the in-phase and quadrature output digital signals to provide a decimated signal;

removing any undesired aliasing signal components from the decimated signal to provide a filtered signal;

formatting the filtered signal into a plurality of digital words for use by a digital signal processor; and controlling the gain of the multi-mode sigma-delta analog-to-digital signal converter using an automatic gain control signal adjustable by internal and external control signals.

2. A method for controlling an integrated multi-mode bandpass sigma-delta radio frequency (RF) receiver subsystem as in claim 1, wherein the input of the multi-mode sigma-delta analog-to-digital signal converter is controlled using a programmable clock generator.

3. A method for controlling an integrated multi-mode bandpass sigma-delta radio frequency (RF) receiver subsystem as in claim 1, wherein the external control signals simultaneously control both the sigma-delta analog-to-digital signal converter and the amplifier.

* * * * *